United States Patent [19]

Weinshenker et al.

[11] 3,996,199

[45] Dec. 7, 1976

[54] OIL SOLUBLE POLYMERIC ANTIOXIDANT PREPARED BY CONDENSATION OF DIVINYLBENZENE, HYDROXYANISOLE, TERTIARY BUTYL HYDROQUINONE, TERTIARY BUTYL PHENOL AND BISPHENOL A UNDER ORTHO ALKYLATION CONDITIONS

[75] Inventors: Ned M. Weinshenker, Palo Alto; Leonard A. Bunes, San Carlos; Roman Davis, Palo Alto, all of Calif.

[73] Assignee: Dynapol Corporation, Palo Alto, Calif.

[22] Filed: Feb. 17, 1976

[21] Appl. No.: 658,943

[52] U.S. Cl. .......................... 260/62; 260/47 UA; 260/624 C; 260/45.95 E; 426/546
[51] Int. Cl.² ........................................ C08K 5/13
[58] Field of Search .............. 260/47 UA, 62, 47 R, 260/45.95

[56] References Cited

UNITED STATES PATENTS

| | | | |
|---|---|---|---|
| 2,665,312 | 1/1954 | Ohlmann et al. ............... | 260/611.5 |
| 2,831,898 | 4/1958 | Ecke et al. ...................... | 260/624 |
| 3,004,953 | 10/1971 | Sonnabend ........................ | 260/62 |
| 3,328,489 | 6/1967 | Murdock .......................... | 260/897 |
| 3,546,173 | 12/1970 | Hunt ................................. | 260/62 |
| 3,733,365 | 5/1973 | Yeakey et al. .................. | 260/624 C |
| 3,758,597 | 9/1973 | Buysch et al. .................. | 260/613 R |
| 3,930,047 | 12/1975 | Dole et al. ........................ | 426/546 |

FOREIGN PATENTS OR APPLICATIONS

| | | | |
|---|---|---|---|
| 709,865 | 5/1965 | Canada .......................... | 260/619 K |

Primary Examiner—Harry Wong, Jr.
Assistant Examiner—Peter F. Kulkosky
Attorney, Agent, or Firm—William H. Benz

[57] ABSTRACT

Phenolic polymers formed by the reaction of divinylbenzene with a mixture of hydroxyanisole, tertiary butylhydroquinone, tertiary butyl phenol and bisphenol A (and optionally para-cresol) under condensation conditions in the presence of a phenol ortho alkylation catalyst are disclosed. These materials find use as oil-soluble antioxidants especially for edibles.

6 Claims, No Drawings

OIL SOLUBLE POLYMERIC ANTIOXIDANT PREPARED BY CONDENSATION OF DIVINYLBENZENE, HYDROXYANISOLE, TERTIARY BUTYL HYDROQUINONE, TERTIARY BUTYL PHENOL AND BISPHENOL A UNDER ORTHO ALKYLATION CONDITIONS

BACKGROUND OF THE INVENTION

This invention relates to oil-soluble phenolic polymers. More particularly it relates to oil-soluble phenolic condensation polymers useful as antioxidants.

Antioxidants are of great use in the food industry today. They make acceptable shelf lives possible for a wide range of products especially products containing fats and oils by delaying the onset of rancidity or spoilage. They also make possible the substantial retention of nutritional and flavor values in edibles. Notwithstanding these benefits, safety questions are causing people in many lands to reevaluate and often restrict or eliminate the use of antioxidants in edibles. One approach to lessening or eliminating the risks of toxicity of food additives was set forth by Zaffaroni in U.S. Pat. No. 3,876,816 issued Apr. 18, 1975. There it is taught that by forming a food additive (in that case a sweetener) into a nondegradable macromolecule, one can prevent absorption of the additive through the gastrointestinal tract wall into the body when the additive is eaten. This principle can be applied to antioxidants with generally good results. However, the obtaining of a nonabsorbable polymeric antioxidant suitable for easy commercial use in edible oils is difficult. A major problem lies in solubility. As a rule, polymer solubility in oil is inversely proportional to the polymer's molecular size. Hence, as one macromolecularizes an antioxidant, one encounters decreasing solubility, often to unacceptably low levels. Another problem is stability. For unknown reasons, many antioxidant species, when made into polymers, undergo major drops in stability. A third problem with macromolecularization of antioxidants is a difficulty with regularly achieving a proper molecular weight. It is required for substantial nonabsorption to minimize the amount of polymer having a molecular weight below about 1000 daltons, especially below about 500 daltons. Similarly, for solubility and functionality reasons, it is desirable to minimize the amount of very large molecules — say having a molecular weight above about 40,000 daltons.

The present invention provides a limited group of polymeric antioxidants which minimize these problems of prior materials. They have good antioxidant activity, good solubility in oils, good stability and proper molecular weights.

STATEMENT OF THE INVENTION

We have now discovered that when divinylbenzene (DVB) is catalytically condensed under ortho alkylation conditions with mixtures comprising hydroxyanisole (HA), tertiary butyl hydroquinone (TBHQ), tertiary butyl phenol (TBP) and bisphenol A (BPA), polymer products useful as antioxidants are produced. Para-cresol (PC) is optionally present in these products as well.

DETAILED DESCRIPTION OF THE INVENTION

The polymeric antioxidants of this invention comprise divinylbenzene (DVB), hydroxyanisole (HA), tertiary butyl hydroquinone (TBHQ), tertiary butylphenol (TBP), bisphenol A (BPA) and optionally para-cresol (PC). They are formed by contacting these components with a phenolic ortho alkylation catalyst under condensation conditions.

These products may be represented structurally as shown in Formula I.

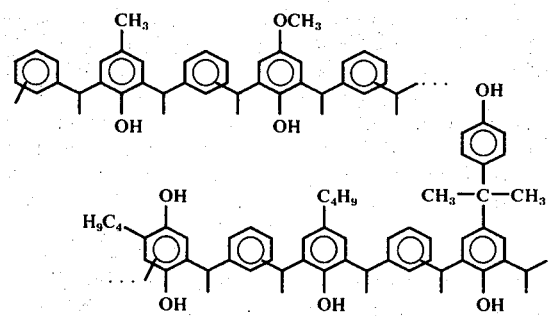

The Components of the Polymers

Divinylbenzene is a major component of these products. It assumes every other position in their alternating phenolicdiolefin-phenolic structure. Divinylbenzene is commercially available as a mixture of 1,3 and 1,4-isomers. It is a refinery product available in several degrees of purity such as 50%, 75%, and 80% purity. The remainder of these materials is primarily ethylvinylbenzene (EVB) with minor amounts of diethylbenzene (DEB), naphthas — heavy ends and other unidentified hydrocarbons which distill with divinylbenzene. A typical material might contain 75% wt DVB, 23% EVB, 0.5% DEB and 1.5% others.

It is possible to increase the divinylbenzene content of any of these materials up to essentially 100% purity by extractive distillation and other techniques known to the art. Most surprisingly, however, it is not necessary to use high purity (such as 95% or greater purity) divinylbenzene. Any of these grades can be used with divinylbenzene containing 10 to 30% of non-diolefinic impurities being preferred. In virtually all other reactions where divinylbenzene is employed as a polymer agent, use of impure divinylbenzene results in rapid chain termination and very low molecular weight polymer products.

The phenolic components of the present materials are well known commercial chemicals. The term "phenolic" as used herein includes the hydroquinone and bis-phenol components of the product. They, too, are available as mixtures of their isomers. The principal isomers are depicted in Formula 1, however.

Ortho-alkylation Catalyst

A catalyst is employed to effect reaction between the phenolics and divinylbenzene. This catalyst may be any of the materials known to catalyze the ring alkylation of hydroxybenzenes in the ortho position. Such materials include, for example, the metal phenolates described by Ecke and Kolka in U.S. Pat. No. 2,831,898 issued Apr. 22, 1958, i.e., phenoxy derivatives of Al, Mg, Fe, Zn, P, As, Sb, Bi and Sn; the polymeric or supported aluminum alcoholates set forth by Yeakey et al in U.S. Pat. No. 3,733,365 issued May 15, 1973; the aluminum mixed salts described by Hokama in U.S. Pat. No. 3,267,154 issued Aug. 16, 1966; and the metals of the 5th and 6th Periods of Groups IV-B and V-B taught by Leston in his U.S. Pat. No. 3,331,879 issued July 18, 1967, i.e., Zr, Hf, Nb and Ta. Aluminum is a preferred catalytic material. The exact form of its addition is believed to not be critical. It is considered, but not known with certainty, that the aluminum, whether added initially as metal, as a salt such as aluminum, isopropoxide or butoxide or as a complex such as triethylaluminum or the like, reacts with the phenolic components to yield as actual active species the corresponding aluminum hydroquinonates and phenolates. A similar conversion likely occurs in the case of other catalysts useful herein. A most preferred catalyst involves the use of the optional para-cresol component. In this case, the active catalyst species is aluminum p-cresoxide formed by reacting aluminum with para-cresol.

The Preparation Process Conditions

In accord with the present invention, divinylbenzene is contacted with a mixture of phenolics in the presence of a phenolic ortho alkylation catalyst and a reaction is effected to yield a polymer product. The preparation reaction is carried out under ortho alkylation conditions. Such conditions may be summarized as being in liquid phase, preferably in a liquid reaction solvent; being at elevated temperature; being for a relatively long period of time such as for at least an hour and being in the presence of an effective amount of a catalyst for alkylation of hydroxyaromatic rings in the ortho position.

As solvent for the reaction are preferably employed organic liquids having an essentially aprotic character. Aromatic hydrocarbons and cycloaliphatic hydrocarbons are representative of suitable solvents. Ethers are aprotic solvents. Used alone, they often lead to gels. They may be used as cosolvents with good results. Examples of suitable solvents include lower aliphatic ethers such as diethyl ether, diisopropyl ether, and di-n-butyl ether; other ethers such as tetrahydrofuran, glyme (1,2-dimethyoxyethane), diglyme, anisole, diphenyl ether and phenetole, and the aromatic and cyloaliphatic liquid hydrocarbons of up to about 12 carbon atoms such as toluene, the xylenes, mesitylene, ethylbenzene, diethylbenzene pseudocumene, benzene, cyclohexane, diethylcyclohexane and the like. Preferred solvents include alkylaromatic liquid hydrocarbons of 7 to 12 carbons such as xylenes and trimethylbenzenes, with xylenes being most preferred.

The preparation reaction is carried out at elevated temperatures such as 80° C or above. Generally, temperatures of from about 80° C to about 250° C are usable, with temperatures of from about 120° C to about 180° C being preferred. It is often convenient to employ the reflux temperature of the solvent system as the reaction temperature. Such temperatures range from about 100° C to about 180° C at atmospheric pressure. Superatmospheric pressures may be employed if it is desired to use temperatures above the atmospheric reflux point.

The reaction times employed to effect production of the present polymers are inversely dependent upon the reaction temperature employed. Generally, times of from about one hour to about 48 hours are employed, with reaction times of from about two hours to about ten hours being preferred.

The relative amounts of reactants and catalyst are controlled. We have achieved what we consider to be our best results when the amount of diolefin employed provides about 2.15 equivalents of vinyl groups per mole of total phenolics. Very satisfactory results are achieved when divinylbenzene containing from 2.08 to 2.25 equivalents of vinyl groups is used per mole of total phenolics with satisfactory results being obtained when from 2.00 to 2.30 equivalents of vinyl groups is employed per mole of phenolics. This close control is necessary to achieve a correct molecular weight product.

In determining this ratio, one must remember that the divinylbenzene contains "monovinyl" impurities which must be accounted for. For example, a common commercial divinylbenzene contains about 79.9% w DVB, 18.1% w ethylvinylbenzene (EVB) and 2% nonolefinic materials. Thus, a "gram mole" of this material (weighing about 130.5 g) would contain 1.58 equivalents of vinyl contributed by DVB and 0.181 equivalents of vinyl contributed by EVB. The total amount (1.76 equivalents per "mole") should be considered in setting the amount to be used.

Among the "phenolics" the relative amounts are controlled as well. The most preferred ratio is as follows:

| Component | Amount, % mole of total phenolic |
|---|---|
| HA | 40 |
| TBHQ | 13 |
| TBP | 25 |
| BPA | 10 |
| PC | 12 |

There may, of course, be variation in these amounts. Para-cresol may be eliminated entirely, especially when an aluminum alkoxide catalyst is employed. It may be raised to as much as 20%, although with no clear benefit to product properties or performance. BPA may be lowered to about 5% or raised to about 15%. Product molecular weight increases and decreases proportional to BPA content. TBP may be raised as high as about 45% or dropped as low as 15%. Higher TBP contents lead to better oil solubility, but lower antioxidant activity.

TBHQ may range from about 7% to about 20% and HA may range from about 25% to about 50%. These two components are major contributors to the products' activity — certain types of activity being proportional to TBHQ content and other types of activity being proportional to HA content.

These relative amounts of feedstocks may be summarized as follows: the most preferred product is formed when:

| | | |
|---|---|---|
| DVB | 2.15 equivalents of vinyl | |
| HA | 0.40 moles | |
| TBHQ | 0.13 moles | |
| TBP | 0.25 moles | |
| BPA | 0.10 moles | |
| PC | 0.12 moles are reacted. | |

Excellent products are formed when the feedstock ratios

| DVB | 2.08 | – | 2.25 | equivalents of vinyl per mole of phenolic |
|---|---|---|---|---|
| HA | 0.30 | – | 0.45 | moles |
| TBHQ | 0.10 | – | 0.17 | " |
| TBP | 0.20 | – | 0.35 | " |
| BPA | 0.07 | – | 0.12 | " |
| PC | 0 | – | .15 | " | are employed.

Generally, very acceptable products are formed when the ratios

| DVB | 2.0 | – | 2.3 | equivalents of vinyl per mole of phenolic |
|---|---|---|---|---|
| HA | 0.25 | – | .50 | moles |
| TBHQ | 0.07 | – | .20 | " |
| TBP | 0.15 | – | .45 | " |
| BPA | 0.05 | – | .15 | " |
| PC | 0.0 | – | .20 | " | are employed.

A catalytically effective amount of catalyst is employed which amount may range from about 0.005 moles of catalyst per mole of total phenolics up to about 0.2 moles of catalyst per mole of total phenolics. Larger amounts can be employed but are not seen to offer any advantages. Preferred amounts of catalyst range from about 0.01 moles of catalyst per mole of total phenolics to about 0.10 moles of catalyst per mole of total phenolics reactant.

The initial and maximum concentration of reactants in the reaction solvent is controlled from about 0.1 to about 20 moles of DVB per liter of solvent and preferably is from about 3 to about 20 moles per liter.

The reaction mixture should be stirred during the reaction. The reaction can be carried out batchwise or with continuous feed of one or more of all of the feedstocks and continuous removal of product.

In a batch mode (which is preferred), especially if the ortho-alkylation catalyst is formed in situ in the reaction mixture, it is desirable to contact the catalyst material or precursor with the phenolic reactants and solvents at or about the reaction temperature for a brief period, such as from 0.01 to 2 hours, preferably 0.02 to 2 hours, prior to adding the DVB reactant.

Following the reaction, the product is isolated from the reaction solvent, the catalyst, and residual feedstocks. The product is also often purified and/or fractionnated into certain molecular weight cuts.

Catalyst removal is usually effected by extraction with aqueous mineral acid such as HCl, $H_2SO_4$ or HBr with aqueous $H_2SO_4$ being preferred. Other methods, such as ion exchange, can also be used. Solvent removal is usually effected by precipitating the product in a non-solvent such as liquid saturated hydrocarbons — for example, hexanes and thereafter filtering and drying the product. These work-up schemes are more fully shown in the examples. Other equivalent methods may be used as well, if desired.

The Polymer Products

The polymer products of this invention are depicted above in Formula I. This formula is not fully illustrative, however, as bisphenol A can undergo additional alkylation which gives rise to some branching. The true structure also incorporates the ethylvinylbenzene groups present in the feed.

The precise chemical composition of the product is not easily determined. Present day analytical techniques do not permit a polymer's structure determination to, for example, the precision that the feed composition is known. With this in mind, the most accurate description of the product may be as the product which results when divinylbenzene and the certain phenolics are condensed in the ratios above set forth. Analysis of the reaction product, both recovered polymer and reaction solvent, gives no substantial suggestion that any preferential reaction occurs or that any product ratio different than that fed obtains.

The reaction products, after recovery by precipitation, have peak molecular weights of from about 4000 to about 12000 daltons, preferably from about 6000 to about 10000 daltons. They generally contain less than 5% of polymer having a molecular weight below about 1000 daltons and less than about 2% of polymer with a molecular weight below about 500 daltons. Whenever molecular weight values are noted herein, they are values obtained or obtainable using gel permeation chromotography techniques. The usual technique is to compare the product to a series of polystyrene standards of known molecular weight. This method is considered to yield values at worst ± 20% of true values.

Use of the Polymer Products as Antioxidants

The present materials are useful as antioxidants. They are advantageously soluble (such as to 500–1000 ppm in oils, especially in edible animal and vegetable oils. When they are admixed with oxidizable substances such as plastics, rubbers, or deterioration-prone foodstuffs in an amount of from about 2 to 50,000 parts per million by weight (basis oxidizable substance), they function to retard oxidation of the substances. In rubbers and plastics these materials offer the advantage of being substantially nonvolatile and thus unlikely to be lost by vaporization. They are also less likely to migrate through these substrates. In oxidizable consumables, as exemplified by pharmaceuticals, vitamins and food products and food components such as edible oils, fats, essential oils, nuts and flavorings, an effective amount of these antioxidant materials, such as from 2 to 10,000 parts per million by weight or preferably from 5 to 1,000 parts per million by weight, is generally employed. In such use, the high molecular weight and concomitant low migration and volatility greatly enhance product processing such as by reducing steam distillation of the antioxidants and eliminating the need to continually add additional antioxidant to compensate for the loss. Also, the antioxidants of this invention, because of their large molecular size, present the advantage of nonabsorptivity through the walls of the gastrointestinal tract, thereby eliminating any risk of toxicity.

When used as antioxidants for oxidizable substances, these materials are intimately admixed with the oxidizable substance, by being mixed as solid particles through the oxidizable substance, by being added as a solution in a suitable carrier, or the like.

The materials of this invention, their production and their use are further illustrated in the following examples. These are intended only to demonstrate the invention and are not to be construed as limiting its scope, which scope is instead defined by the appended claims.

EXAMPLE I

A 5 liter flask was equipped with a stirrer, an argon bleed, a thermowell, and a vacuum condenser. To this flask was charged 298 g (2.4 moles) of HA, 133 g (0.8 moles) of TBHQ, 137 g (0.6 moles) of BPA, 225 g (1.5 moles) of TBP, and about 0.9 l of xylene. A catalyst solution was separately prepared by gradually adding 4.9 g of metallic aluminum to a mixture of 75.9 (0.70 moles) of PC and 60 ml of xylene with stirring until hydrogen evolution diminishes. This catalyst was added to the 5 liter flask and rinsed in with heated xylene (0.3 l). Then, 945 g of 79.9% pure DVB (18.1% ethylvinyl benzene — 2.0% naphthalenes) was added with stirring and a 0.24 l xylene rinse. The reaction mass was heated to 125° C with stirring. The reaction slowly exothermed to 140°–145° C and was there maintained until 2.5 hours had elapsed (since initial heating). The reaction flask was then cooled to 70° C and 0.8 l of diethylether was gradually added. The reaction mass was further cooled to below 65° C.

The reaction product was worked up as follows: first, it was transferred to a 22 l flask having a bottom drain and a stirrer where it was diluted to 6 liters with diethylether (this requires about 2.8 l of ether).

The ether solution was extracted 3 times with a total of about 10 l of 10%w sulfuric acid to remove aluminum. The organic phase was then extracted twice with a total of 6 liters of saturated aqueous sodium chloride. The organic phase was then dried by the addition of 1.4 kg of anhydrous sodium sulfate with stirring for an hour. The drying salt was removed by filtration and diethylether was added to the organic phase to a total volume of 6 liters.

The product was recovered by precipitation which resulted when the diethylether solution was added over about 2 minutes to 54 liters of vigorously stirred hexane. The hexane mixture was filtered. The solids were washed with hexane and sucked dry. Then, the solids were dried in a 90° C vacuum drying oven under an argon bleed at 3–5 mm Hg absolute pressure. Drying was continued until an essentially hexane-free product was observed. In a typical one of several repeats of the reaction just described, 1.37 kg (76% yield) of an off-white product was recovered. This product had the following composition and properties:

| Component | Relative Amount, Moles |
| --- | --- |
| DVB | 1.+ |
| HA | .45* |
| TBHQ | .13* |
| PC | .14** |
| TBP | .20** |
| BPA | .16** |

*By titration.
**Estimated from $C_{13}$ NMR spectra.

| | |
| --- | --- |
| Peak molecular weight | 8500 |
| % greater than 10,000 mw | 37% |
| % less than 1,000 mw | 6% |

| Component | Relative Amount, Moles |
| --- | --- |
| % less than 500 mw | 0.8% |

EXAMPLE II

The preparation of Example I was repeated with several modifications. The scale was reduced about 60-fold, the reaction time extended to 3 hours from 2½ hours and the feed ratios were as follows:

| | | |
| --- | --- | --- |
| DVB | 2.10 | Equivalents of vinyl |
| HA | 0.30 | moles |
| TBHQ | 0.10 | " |
| TBP | 0.40 | " |
| BPA | 0.05 | " |
| PC | 0.15 | " |
| Aluminum | 0.03 | " |

The precipitation was effected using a refinery cut "Skelly B" as nonsolvent. Drying was at 50° C yielding a product having a composition consistent with the feed composition and a peak molecular weight of 5800, 29% above 10,000, and 2% below 1,000 daltons.

EXAMPLE III

The preparation of Example II was repeated using the feed ratios:

| | | |
| --- | --- | --- |
| DVB | 2.21 | Equivalents of vinyl |
| HA | 0.45 | moles |
| TBHQ | 0.15 | " |
| TBP | 0.20 | " |
| BPA | 0.10 | " |
| PC | 0.10 | " |
| Aluminum | 0.03 | " |

The product had a peak molecular weight of 6400, 42% above 10,000, and 4% below 1,000 daltons.

EXAMPLE IV

The preparation of Example III is repeated substituting 0.03 moles of aluminum isopropoxide for the 0.03 moles of aluminum metal there employed. The PC is eliminated and the other components are increased to the ratios.

| | | |
| --- | --- | --- |
| DVB | 2.20 | Equivalents of vinyl |
| HA | 0.50 | moles |
| TBHQ | 0.16 | " |
| TBP | 0.23 | " |
| BPA | 0.11 | " |

A product similar to the product of Example III results.

EXAMPLE V

The preparation of Example IV is repeated with one variation. In place of 0.03 moles of aluminum isopropoxide, 0.02 moles of zirconium phenoxide, prepared in accord with Example I of Leston's U.S. Pat. No. 3,331,879, issued July 18, 1967, is employed as a catalyst. A reaction product in accord with present Example IV is obtained.

What is claimed is:

1. The polymer product having a peak molecular weight of from about 4000 to about 12000 which results when divinylbenzene is condensed in aprotic organic solvent with a mixture of phenolics comprising hydroxyanisole, tertiarybutylhydroquinone, tertiarybutylphenol and bisphenol A in the presence of a catalytically effective amount of a catalyst for the orthoalkylation of hydroxyaromatics under ortho ring alkylation conditions, said divinylbenzene and phenolics being in the relative molar proportions of:

| | |
|---|---|
| divinylbenzene | 2.0–2.3 Equivalents of vinyl per mole of phenolics |
| hydroxyanisole | 0.25–.50 |
| tertiarybutyl-hydroquinone | 0.07–.20 |
| tertiarybutyl-phenol | 0.15–45 |
| bisphenol A | 0.05–15 | the initial concentration of divinylbenzene in the solvent being in the range of from about 0.1 to about 20 moles per liter.

2. The polymer product of claim 1 being further characterized as containing in the mixture of phenolics para-cresol in an amount of from 0.0 to 0.20 moles per 2.0–2.3 equivalents of vinyl.

3. The polymer product of claim 2 wherein said catalytically effective amount of catalyst is from 0.005 to 0.2 mole of catalyst per mole of divinylbenzene.

4. The polymer product of claim 3 wherein said divinylbenzene has a purity of from about 75% to about 90%.

5. The polymer product having a peak molecular weight of from about 4000 to about 12000 which results when divinylbenzene of from 75% to 90% purity is condensed in an aprotic organic solvent with a mixture of phenolics comprising hydroxyanisole, tertiarybutylhydroquinone, tertiarybutylphenol, bisphenol A and paracresol in the presence of an aluminum catalyst under ortho ring alkylation conditions, said divinylbenzene and phenolics and catalyst being in the relative molar proportions of:

| | | | |
|---|---|---|---|
| divinylbenzene | 2.08 | – | 2.25 equivalents of vinyls per mole of phenolics |
| hydroxyanisole | 0.30 | – | .45 |
| tertiarybutyl-hydroquinone | 0.10 | – | .17 |
| tertiarybutyl phenol | 0.20 | – | 35 |
| bisphenol A | 0.07 | – | .12 |
| paracresol | 0.0 | – | .15 |
| aluminum | 0.01 | – | 0.1 | the initial concentration of divinylbenzene in the solvent being in the range of from about 0.1 to about 20 moles per liter.

6. The polymer product of claim 5 wherein divinylbenzene, phenolics and catalyst are in the relative molar proportions of:

| | | |
|---|---|---|
| divinylbenzene | about 2.15 equivalents of vinyl per mole of phenolics. | |
| hydroxyanisole | about | 0.40 |
| tertiary butyl hydroquinone | about | 0.13 |
| tertiary butyl phenol | about | 0.25 |
| bisphenol A | about | 0.10 |
| paracresol | about | 0.12 |
| aluminum | 0.01 – | 0.10. |

* * * * *